United States Patent Office 2,840,563
Patented June 24, 1958

2,840,563

RUBBER ACCELERATOR

Robert C. Kinstler and Donn E. Young, Middlesex, N. J., assignors to American Cyanamid Company, New York, N. Y., a corporation of Maine No Drawing. Application August 1, 1956
Serial No. 601,348

7 Claims. (Cl. 260—306.5)

This invention relates to a dust free composition comprising a rubber vulcanization accelerator. More particularly, it relates to a pelletized composition comprising benzothiazolyldisulfide, and a method of preparation.

Solid rubber compounding ingredients, for instance, vulcanization accelerators such as benzothiazolyldisulfide, are generally prepared as fine powders. Finely powdered benzothiazolyldisulfide, however, when incorporated into rubber by milling leaves much to be desired. For example, it sticks and cakes on the mill rolls and is not readily dispersed in the rubber. In addition, it is extremely dusty so that the air surrounding the mill soon becomes contaminated. This results in a loss of material as well as undesirable working conditions for those required to handle the material.

These disadvantages could be greatly reduced if finely powdered benzothiazolyldisulfide could be formed into aggregates or pellets. It has been suggested that this be accomplished by agitating an aqueous suspension comprising the powder and a waxy material at a temperature above the melting point of the latter, whereby it is alleged that agglomerates of benzothiazolyldisulfide will form through the binding action of the waxy material. It has also been suggested that such pellets might be formed by compressing a mixture of benzothiazolyldisulfide, a rubber hydrocarbon and a hardening agent into a solid mass which could then be subdivided into pellets of the desired size.

Commercially acceptable benzothiazolyldisulfide must meet two requirements which appear to be conflicting. First, the particles comprising each pellet should cohere sufficiently to withstand shipment and handling without breaking down to give dusty fines. Second, when subjected to the shearing forces and mill temperatures during mastication on the rubber mill, the pellets should disintegrate to give a uniform and fine dispersion of benzothiazolyldisulfide particles throughout the rubber. The pellets should be readily "wetted" by the rubber so that they do not fall out of the rubber on the under side of an open mill roll. The pellets must not be so hard that they "pop" or fly from the roll nip.

It is a relatively simple matter to make pelletized benzothiazolyldisulfide. It is another matter to form pellets which disperse well in rubber. High molecular weight plastics, resins, glue, and the like will "bind" benzothiazolyldisulfide into pellets of high mechanical strength such as to satisfy the shipment and handling requirement. On incorporation into rubber, however, such pellets are broken down only to the extent of roll clearance and are not materially affected by the shear forces in the rubber. Such "binders," moreover, are neither soluble in rubber nor do they melt or soften at milling temperature, the presence of which characteristics provide for good dispersion.

It is a principal object of this invention to provide benzothiazolyldisulfide as pellets which comply with the requirements set forth above. It is particularly an object of this invention to provide pellets of benzothiazolyldisulfide which are characterized by the quality of excellent dispersibility when incorporated into rubber. It is a further object of this invention to provide a method for producing such pellets. It is a still further object of this invention to provide such a method which is capable of consistently reproducing such an excellent dispersing pelletized product with a minimum of control and supervision.

In accordance with the present invention, these objects have been met in a surprisingly effective manner. In general, pelletized benzothiazolyldisulfide having the desired characteristics is prepared by forming an aqueous slurry comprising finely divided benzothiazolyldisulfide and a small amount of $\beta$-naphthol. The aqueous slurry is then heated and agitated to provide contact for agglomeration. After agglomerates of desired size have been formed, the slurry is cooled and resultant pellets separated.

The aqueous benzothiazolyldisulfide slurry subjected to the pelletizing process of this invention may be prepared by oxidizing an aqueous solution of sodium mercaptobenzothiazole. This latter solution may result from purification of an impure mercaptobenzothiazole melt by digesting with a deficiency of caustic thereby leaving tarry by-products and part of the mercaptobenzothiazole. Alternatively, the purification may comprise steam stripping an impure mercaptobenzothiazole melt as taught in U. S. Patent No. 2,658,864 and then digesting the resultant mercaptobenzothiazole in aqueous solution with an excess of caustic followed by a selective precipitation of mercaptobenzothiazole-free tarry impurities according to U. S. Patent No. 2,730,528.

The benzothiazolyldisulfide slurry may also be prepared by isolating the disulfide as prepared by either of the above processes and reslurrying the dry powdered accelerator in water. Additionally, it may also be prepared by precipitating and separating free mercaptobenzothiazole from a solution of the sodium salt thereof, redissolving it in caustic and then oxidizing it to disulfide. Because the formation of pellets according to the process of this invention, unlike some processes, is not dependent on the absence or presence of impurities and/or by-products generally found in the tarry settler heels always present in most mercaptobenzothiazole purification procedures, it is immaterial how the benzothiazolyldisulfide slurry is prepared.

The density of the aqueous benzothiazolyldisulfide slurry employed in the instant process is limited principally by apparatus limitations. A slurry of which the solids content is much in excess of about 30% is too pasty and is difficult to agitate and pump in a satisfactory manner. Too concentrated slurries, moreover, tend to reduce the control of pellet size which is important. Accordingly, the solids content of the slurry should not be much in excess of 30% and usually will be from about 5–15%.

The agglomerating agent, i. e., $\beta$-naphthol, is preferably added to the benzothiazolyldisulfide slurry as a solution, for instance a caustic solution. The amount of real $\beta$-naphthol employed may be quite widely varied. Usually it will be the practice to use at least about 1% on the weight of the benzothiazolyldisulfide. Normally, it will be greater than this but more than about 12% appears to provide no added advantage. The amount $\beta$-naphthol employed, therefore, will usually be less than about 12% by weight of the benzothiazolyldisulfide, generally in the range of about 4–8%.

After the slurry comprising benzothiazolyldisulfide and $\beta$-naphthol has been prepared, it is subjected to heating. Preferably the temperature is raised to at least about 75° C. and preferably 85–100° C. Agglomeration does not appear to progress too well much below 85° C. while there appears to be little advantage gained by operating at greater than 100° C. Agitation is conducted during the period an elevated temperature is maintained. By what means it is conducted forms no part of the invention. The more violent the agitation, however, the smaller and more uniform the size of the subsequently recovered pellets. When agglomeration has reached the desired point, the slurry is cooled and resultant pellets separated.

Why β-naphthol should cause agglomeration and result in the formation of pellets of benzothiazolyldisulfide which are characterized by unusually excellent dispersibility where no pellets of any description are formed in its absence is not known. Nor is there any desire to limit this invention by an explanation of this action which would be at the most a mere supposition. It is clearly evident, however, that the action is not one of mechanical binding of the particles such as would apparently occur, for instance, when using waxy binders as has been suggested in the prior art.

In accordance with the above-described procedure, the pH of the aqueous benzothiazolyldisulfide mixture prior to heating is about 8–8.5. In prior art pelletizing procedures in which a waxy material is suggested as the agglomerating agent, it is claimed to be distinctly advantageous to conduct the heating and agglomerating step at a neutral or acid pH. Prior to heating, therefore, and preferably before addition of the waxy material, the pH is adjusted as by the addition of hydrochloric acid to 5–7 or even lower. In the present process, however, there is no such restriction. Because of the unusual agglomerating characteristics of β-naphthol, it is possible to conduct agglomeration at either acid or alkaline conditions.

By the process as described to this point, heating and agglomerating must be conducted for a matter of hours before excellent dispersible pellets of the desired size are obtained regardless of whether the pH is acid or alkaline. This is not wholly satisfactory inasmuch as equipment is tied up and production decreased by the prolonged agglomeration step. As an added feature and a preferred embodiment of this invention, however, it has been surprisingly discovered that the period of agglomeration can be materially reduced by a combination heating-pH adjustment step.

As already noted, the pH of the benzothiazolyldisulfide mixture is alkaline when initially prepared. According to this invention, this alkaline mixture is heated to greater than about 85° C. and preferably to boiling, and maintained there for a period of time ranging up to an hour but generally 15–30 minutes. The pH of the mixture, preferably without cooling, is then adjusted to neutral or acid as by the addition of acetic, hydrochloric, sulfuric or the like acids. The adjusted pH will usually be about 5.0–5.5 but may be as low as 4. Lower pH's however, are not preferred because of foaming and conversion problems. The elevated temperature is then maintained while agitating the mixture. Where agglomeration in the absence of this unique heating and pH adjustment step may require as much as six hours, similar results can now be surprisingly obtained in less than one hour and in most instances from 10–15 minutes.

Other materials may also be added to the slurry so as to be present in the final pellets. Thus, it is highly desirable to have present in the pellets a fatty acid, such as stearic acid or a metal salt thereof, to aid in dispersion of the pellets in rubber. Fatty acids have heretofore been suggested as agglomerating agents in proposed pelletizing procedures. In the present invention, however, the presence of a fatty acid in the aqueous slurry undergoing treatment is not intended to cause agglomeration. It is added to the slurry only so that it will be present in the final pellets to serve as a lubricant therefor when dispersed in rubber. The amount of real stearic acid required for lubricating purposes will range from about 5–15% but will generally be about 8–12%. Since it does not effect pelletization it may be added at any stage of the process. As a practical matter, however, it is desirable to add it to the aqueous slurry along with the other components.

Pellet size is related to intensity of agitation. The more violent the agitation, the smaller the pellet size. The intensity of agitation should preferably be uniform so as to produce pellets of a uniform size range. Pellet size should preferably be larger than about 100 mesh since smaller pellets tend to be dusty. At the same time, the size should preferably not be greater than about 5 mesh since larger sizes tend to be difficult to disperse in rubber.

It has not been possible to definitely establish the composition of the pellets produced according to the process of this invention. A 100% composition will probably consist of 75–80% benzothiazolyldisulfide, 5–8% free mercaptobenzothiazole and 8–9% stearic acid. In addition, reaction products of the agglomerating agent with benzothiazolyldisulfide appear ranging in amounts of 6–9%.

The process and pelletized composition comprising this invention are further illustrated by the following examples. All parts are by weight unless otherwise noted. Throughout the examples the following abbreviation will be used:

MBTS—benzothiazolyldisulfide

*Example 1*

To 7,000 part of an aqueous slurry containing 259 parts of MBTS is added a solution of sodium stearate containing 26 parts of stearic acid and a solution of 10.4 parts of β-naphthol in sufficient 15% sodium hydroxide to dissolve it. The mixture is then stirred and heated to 100° C. for 15 minutes after which it is acidified with acetic acid to pH 5.0–5.5. Heating at the boil is then continued with stirring for 10 minutes until beadlike agglomerates form. Cold water is added to the mixture to drop the temperature to 60° C. The agglomerated product is separated by screening, washed, and dried to give a pelletized product of about 20 mesh which exhibits excellent dispersibility on incorporation in rubber.

Example 2 further illustrates the pelletizing action of β-naphthol by demonstrating that pellets are not obtained in its absence.

*Example 2*

To 1200 parts of an aqueous slurry containing 50 parts of MBTS is added a sodium stearate solution containing 10 parts of stearic acid. The mixture is stirred and dilute acetic acid added to reduce the pH to 5.0–5.5. It is then heated to and held at 98°–100° C. for 6 hours while stirring. There is no evidence of agglomeration of the fine particles. The slurry is quenched with cold water and filtered to yield a fine powder similar to the starting material.

*Example 3*

To 1500 parts of an aqueous slurry containing 70 parts of MBTS is added 8 parts of β-naphthol in sufficient dilute sodium hydroxide to complete solution. Hydrochloride acid is added to adjust the pH of the mixture to about 6.0, and the slurry heated to the boiling point with agitation for two hours. Small agglomerates form, which upon cooling, filtration and drying are found to be about 16 mesh in size.

*Example 4*

Example 3 is repeated except that after agglomeration is substantially complete, but before cooling, 7 parts of stearic acid are added and the slurry agitated for an additional 5 minutes. The slurry is then cooled and the pellets separated. The pellets so obtained have better dispersing properties than those of Example 3.

We claim:

1. A method of pelletizing benzothiazolyldisulfide which comprises: agitating an aqueous slurry comprising benzothiazolyldisulfide and β-naphthol at an elevated temperature for sufficient time to agglomerate the benzothiazolyldisulfide, and separating resultant pellets.

2. A method according ot claim 1 in which the pH of the slurry is adjusted to less than about 7 prior to agitating at an elevated temperature.

3. A method according to claim 1 in which the slurry is heated to and maintained at greater than about 85° C. for a short period, the pH adjusted to less than about 7, and the elevated temperature then maintained for sufficient time to agglomerate benzothiazolyldisulfide.

4. A method of pelletizing benzothiazolyldisulfide which comprises: preparing an aqueous slurry comprising benzothiazolyldisulfide in finely divided form and 4-8% on the weight of the benzothiazolyldisulfide of β-naphthol; heating said slurry to a temperature greater than about 85° C.; subsequently adjusting the hydrogen ion concentration to an acid pH not less than about 4; agitating the slurry and maintaining the temperature thereof at greater than about 85° C. for an additional period sufficient to form agglomerates; cooling the slurry and separating pellets.

5. A method according to claim 4 in which the pH is adjusted to 5.0–5.5.

6. A method according to claim 4 in which about 5–15% stearic acid is present in the aqueous slurry when subjected to heating after pH adjustment.

7. A pelletized benzothiazolyldisulfide composition prepared according to the method of claim 1.

References Cited in the file of this patent
UNITED STATES PATENTS

| | | |
|---|---|---|
| 2,598,229 | Creed | May 27, 1952 |
| 2,598,319 | Throdahl | May 27, 1952 |
| 2,762,855 | Creed | Sept. 11, 1956 |